(12) United States Patent
Levatte et al.

(10) Patent No.: US 10,433,115 B1
(45) Date of Patent: Oct. 1, 2019

(54) BLOCKCHAIN-BASED PERSONAL LOCATION AND MESSENGER DEVICE AND SYSTEM USING DECENTRALIZED MESH NETWORKING

(71) Applicant: Countia, LLC, Tampa, FL (US)

(72) Inventors: Ronell Levatte, Tampa, FL (US); Ryan Seay, Cambridge, MA (US)

(73) Assignee: Countia, LLC, Tampa, FL (US)

( * ) Notice: Subject to any disclaimer, the term of this patent is extended or adjusted under 35 U.S.C. 154(b) by 0 days.

(21) Appl. No.: 16/238,065

(22) Filed: Jan. 2, 2019

(51) Int. Cl.
| | |
|---|---|
| *H04W 24/00* | (2009.01) |
| *H04W 4/029* | (2018.01) |
| *G06F 16/23* | (2019.01) |
| *H04L 29/08* | (2006.01) |
| *H04W 4/12* | (2009.01) |
| *H04W 84/06* | (2009.01) |
| *H04W 84/18* | (2009.01) |
| *H04W 84/04* | (2009.01) |

(52) U.S. Cl.
CPC ........ *H04W 4/029* (2018.02); *G06F 16/2365* (2019.01); *H04L 67/104* (2013.01); *H04W 4/12* (2013.01); *H04W 2209/38* (2013.01); *H04W 84/042* (2013.01); *H04W 84/06* (2013.01); *H04W 84/18* (2013.01)

(58) Field of Classification Search
CPC . H04L 2209/38; H04L 9/0637; H04L 9/3236; H04L 2209/56; H04L 9/3247; H04L 9/0643; H04L 9/3242; H04L 9/3265; H04L 67/104; H04L 9/30; H04L 9/3263; H04L 9/0861; H04L 9/32; H04L 63/0823; H04L 63/123; H04L 9/0618; H04L 9/0825; H04W 84/18; H04W 12/06
See application file for complete search history.

(56) References Cited

U.S. PATENT DOCUMENTS

| | | | |
|---|---|---|---|
| 2018/0165416 A1* | 6/2018 | Saxena | ................ G16H 40/20 |
| 2018/0204260 A1* | 7/2018 | McGregor | ......... G06Q 30/0609 |
| 2018/0240101 A1* | 8/2018 | Chan | ................ G06Q 20/3278 |

* cited by examiner

*Primary Examiner* — Khalid W Shaheed
(74) *Attorney, Agent, or Firm* — Albert Bordas, P.A.

(57) ABSTRACT

A personal locational and messenger device and system having a decentralized mesh network, a blockchain, and a device operatively associated with a non-transitory computer readable medium. The blockchain is implemented through application programming interfaces and software development kits. The blockchain is associated with the decentralized mesh network to define a personal location platform and a messenger platform. The decentralized mesh network has a plurality of nodes operatively associated to each other. The decentralized mesh network has a full mesh topology or a partial mesh topology. The device communicates through the decentralized mesh network. The blockchain stores a personal location and messages provided by users. The decentralized mesh network disseminates the personal location and the messages.

11 Claims, 2 Drawing Sheets

BLOCKCHAIN-BASED PERSONAL LOCATION AND MESSENGER DEVICE AND SYSTEM USING DECENTRALIZED MESH NETWORKING

BACKGROUND OF THE INVENTION

1. Field of the Invention

The present invention relates to personal location and messenger systems, and more particularly, to personal location and messenger systems that are blockchain based and use decentralized mesh networking.

2. Description of the Related Art

Applicant is not aware of any personal locational and messenger devices and systems having the novel features of the present invention.

SUMMARY OF THE INVENTION

The present invention is a personal locational and messenger device and system comprising a decentralized mesh network, a blockchain, and a device operatively associated with a non-transitory computer readable medium. The blockchain is implemented through application programming interfaces and software development kits. The blockchain is associated with the decentralized mesh network to define a personal location platform and a messenger platform.

The decentralized mesh network comprises a plurality of nodes operatively associated to each other. The decentralized mesh network comprises a full mesh topology or a partial mesh topology. The blockchain is an immutable blockchain system. The decentralized mesh network and the blockchain provide an immutable and decentralized platform.

The device communicates through the decentralized mesh network. The blockchain stores a personal location and messages provided by users. The decentralized mesh network disseminates the personal location and the messages. The device communicates through wireless networking infrastructures.

The device communicates through a satellite communication infrastructure. The satellite communication infrastructure is a Global Positioning System/Global Navigation Satellite System. The device also communicates through a cellular network. The device communicates through the decentralized mesh network when the wireless networking infrastructures and the cellular network are not available. The personal locational and messenger device and system works in rural and remote locations and comprises a peer to peer network.

The device is a computer device, such as, but not limited to smart phones, tablets, smart watches, and computers including supercomputers, mainframe computers, minicomputers, and microcomputers.

The users send messages and personal location to a recipient through the device by the decentralized mesh network. When the users designate the recipient, only respective recipient is able to view the message or the personal location. The personal locational and messenger device and system allows for tracking, storage, and communication of the message and the personal location as authorized by the user.

It is therefore one of the main objects of the present invention to provide a personal locational and messenger devices and systems.

It is another object of this invention to provide a personal locational and messenger device and system to send messages and share personal locations through a decentralized mesh network.

It is another object of this invention to provide a personal locational and messenger device and system able to work without wireless networking infrastructures and cellular networks.

It is another object of this invention to provide a personal locational and messenger device and system to send messages and share personal locations without wireless networking infrastructures and cellular networks.

It is another object of this invention to provide a personal locational and messenger device and system to send messages and share personal locations from remote and rural areas.

It is another object of this invention to provide a personal locational and messenger device and system that is also able to connects to wireless networking infrastructures, cellular networks, and global positioning system/global navigation satellite system.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
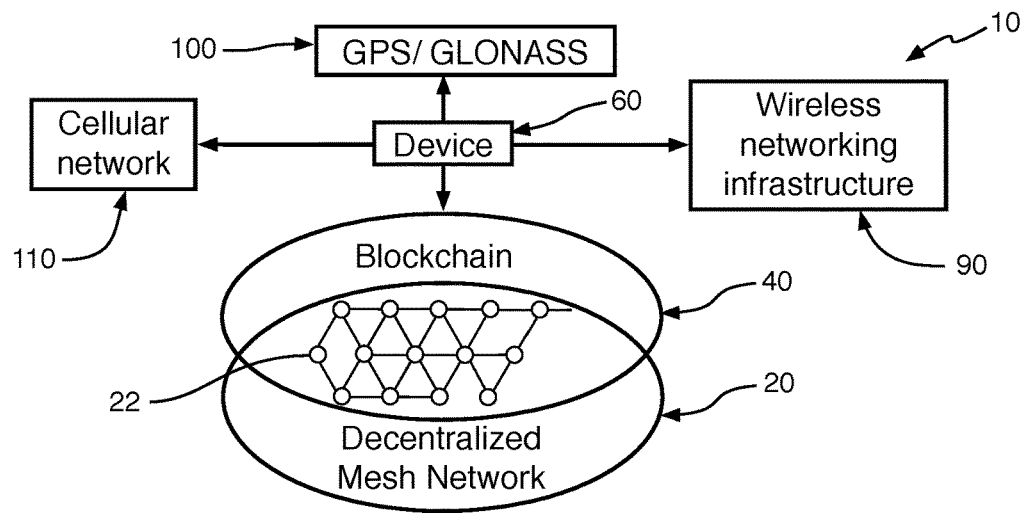
FIG. 1 is a diagram of the present invention.

Referring now to the drawings, the present invention is a personal locational and messenger device and system, and is generally referred to with numeral 10. It can be observed that it basically includes decentralized mesh network 20, blockchain 40, and device 60.

Figure 2:
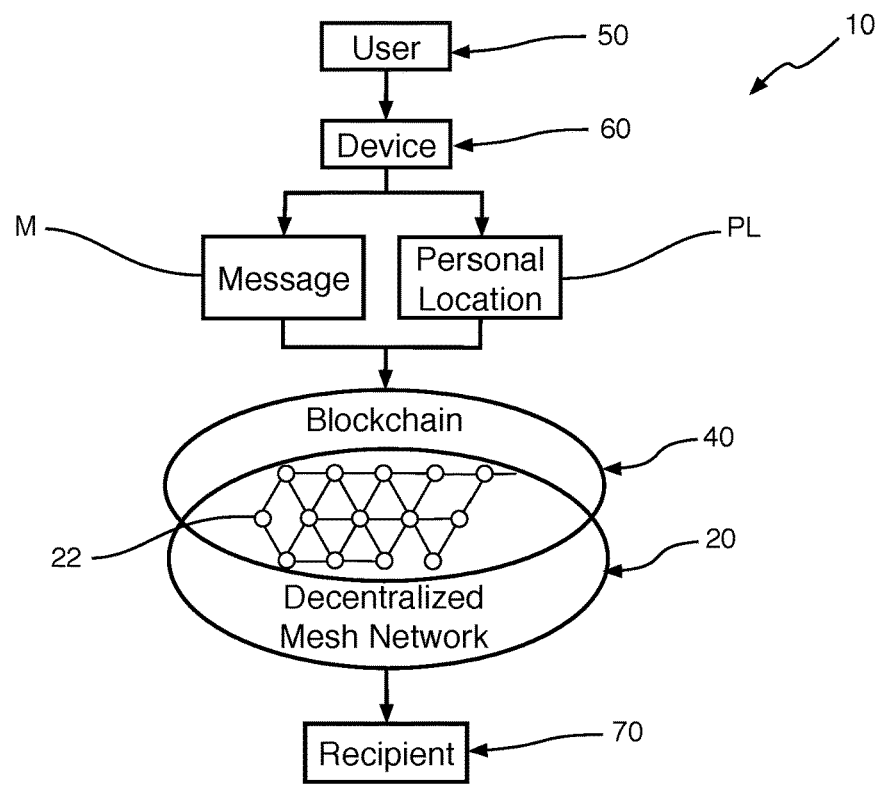
FIG. 2 is an isolated operation flowchart of the present invention.

As seen in FIGS. 1 and 2, present invention 10 allows users 50 to participate in a personal location notification and messenger platform, which is resolved, stored, condensed and disseminated through an immutable, decentralized blockchain 40. Present invention 10 allows for the tracking, storage, and communication of personal location information as authorized by individual users 50 with this information stored in blockchain 40. It is noted that blockchain 40 may be a permissioned or non-permissioned blockchain.

Present invention 10 is designed to primarily communicate through decentralized mesh network 20, and satellite communication infrastructures that comprise Global Positioning System (GPS)/Global Navigation Satellite System (GLONASS) 100, but will utilize wireless networking infrastructure 90 or cellular network 110 when available. Decentralized mesh network 20 comprises a full mesh topology or a partial mesh topology.

A mesh network in general, or simply meshnet, is a local network topology in which the infrastructure nodes, i.e. bridges, switches and other infrastructure devices, connect directly, dynamically and non-hierarchically to as many other nodes as possible and cooperate with one another to efficiently route data from/to clients. This lack of dependency on one node allows for every node to participate in the relay of information. Mesh networks dynamically self-organize and self-configure, which can reduce installation overhead. The ability to self-configure enables dynamic distribution of workloads, particularly in the event that a few nodes should fail. This in turn contributes to fault-tolerance and reduced maintenance costs.

The immutability of the infrastructure of blockchain 40 is essential to the design of present invention 10, as an immutable distributed, and decentralized platform ensures the validity and integrity of communicated positional and emergency message communications. Therefore, blockchain 40, using decentralized mesh network 20, provides an immutable and decentralized platform, whereby a personal location platform and a messenger platform are supported.

Present invention 10 allows users 50 to be sure that their communicated position, defined as personal location PL, and message M, are sent and stored as intended without intrusion or manipulation from outside third parties. When users 50 designate intended recipients 70, only the respective intended recipients 70 will be able to view communicated positional and emergency message data.

As stated above, present invention 10 allows for communication through decentralized mesh network 20, wireless networking infrastructures 90, GPS/GLONASS 100, and cellular network 110. However, when wireless networking infrastructures 90 and cellular network 110 are available, present invention 10 utilizes their larger bandwidths. That being, device 60 is primarily designed to assist in instances where wireless networking infrastructures 90 and cellular network 110 are not available. In rural and remote locations, present invention 10 uses decentralized mesh network 20 to communicate in a peer-to-peer network between devices 60, and satellite systems as GPS/GLONASS 100 to disseminate information globally. Device 60 is operatively associated with a non-transitory computer readable medium. In a preferred embodiment, device 60 is any computer device, including but not limited to, smart phones, tablets, smart watches, and computers including supercomputers, mainframe computers, minicomputers, and microcomputers.

Seen in FIG. 2 is an isolated operation flowchart of present invention 10, whereby mesh network 20 comprises a plurality of nodes 22 operatively associated to each other. Blockchain 40 is associated with decentralized mesh network 20 to define a personal location platform and a messenger platform, whereby blockchain 40 stores personal locations PL and messages M provided by users 50. Blockchain 40 is implemented through application programming interfaces and software development kits. Decentralized mesh network 20 allows entities to act as nodes 22 in a platform of decentralized mesh network 20, which greater increases the safety and range of device 60 in remote or rural areas.

For example, a park ranger station in a National Forest could implement a node 22 that acts as recipient 70 and disseminator of communications of decentralized mesh network 20 in the area. If node 22 of park rangers' station is configured to alert emergency professionals, the park rangers receive the positional and emergency message communication from the originating device 60. If node 22 of park rangers' station is not set to notify emergency professionals, the park rangers' station would merely act as a communication portal to disseminate the message to the outside world.

Figure 3:
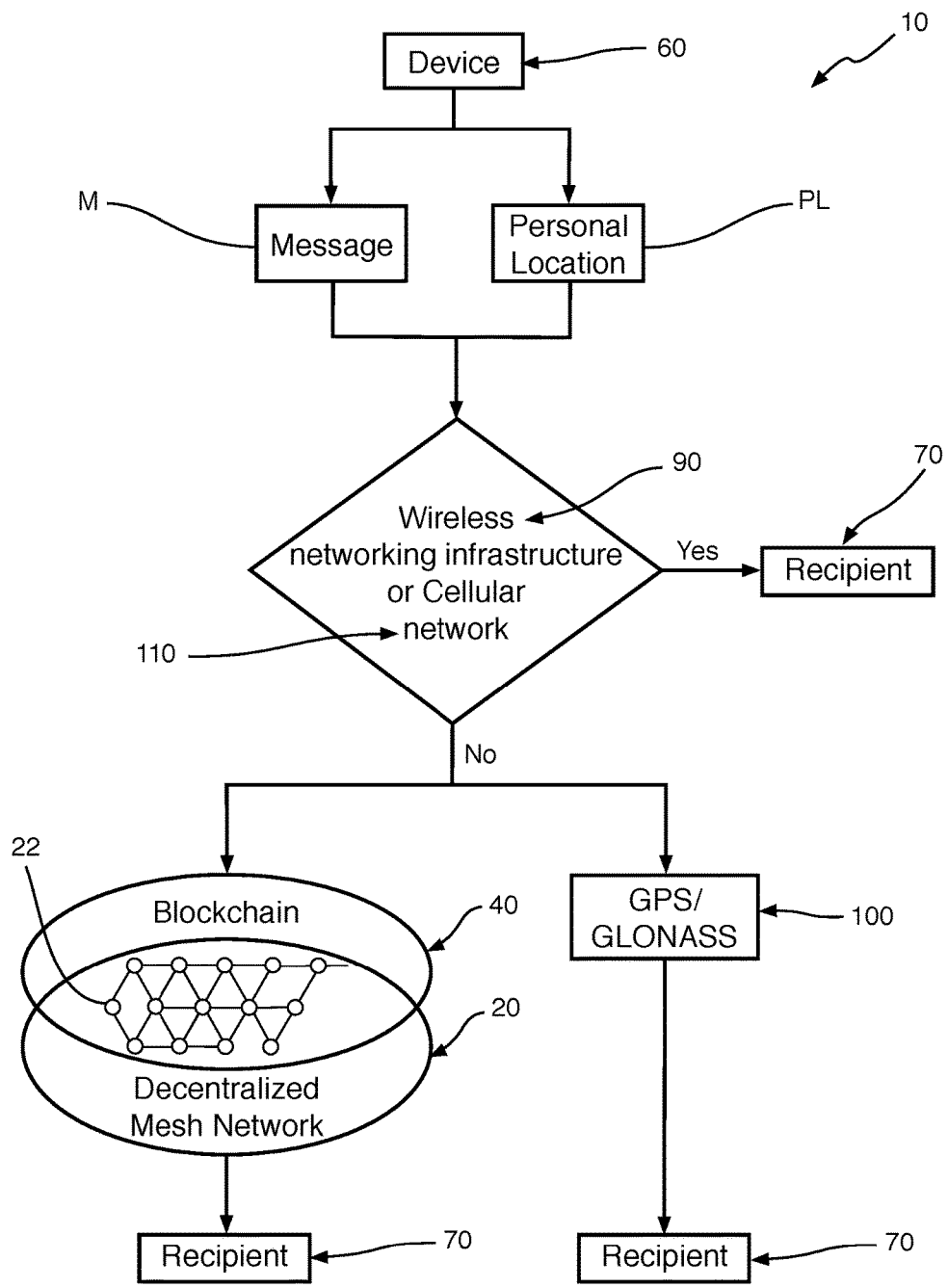
FIG. 3 is an operation flowchart of the present invention.

As seen in FIG. 3, when device 60 is within a high-fidelity networking range, such as within wireless networking infrastructures 90 or cellular network 110, it allows users 50, seen in FIG. 2, to compose short communication messages, defined as message M to be sent with their positional data, defined as personal location PL. When device 60 is in low-fidelity networking range, such as in GPS/GLONASS 100 or decentralized mesh network 20, device 60 makes use of pre-composed emergency messages M, as defined by users 50, which are available for selection at the time of positional location dissemination.

Present invention 10 is also particularly useful in instances where user 50 are unaware of where he or she currently is located and needs services rendered at the location. For instance, a user 50 who finds he or she has experienced car trouble in a remote location is able to quickly and safely communicate this location to roadside service professionals, such as "AAA", without effort. The fact that the area does not have cellular service or wireless access points is irrelevant as decentralized mesh network 20 and GPS/GLONASS 100 communicate the necessary information to "AAA", which allows them to locate and render services to user 50.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A personal locational and messenger device and system, consisting essentially of:
   A) a decentralized mesh network;
   B) a blockchain, said blockchain is an immutable blockchain system; and
   C) a device operatively associated with a non-transitory computer readable medium, said blockchain is associated with said decentralized mesh network to define a personal location platform and a messenger platform, said decentralized mesh network having a plurality of nodes operatively associated to each other and a full mesh topology or a partial mesh topology, said decentralized mesh network and said blockchain provide an immutable and decentralized platform, said device communicates through said decentralized mesh network, said blockchain stores a personal location and emergency messages provided by users, said decentralized mesh network disseminates said personal location and said emergency messages, and said device communicates through wireless networking infrastructures or through a satellite communication infrastructure, said device also communicates through a cellular network, said device communicates through said decentralized mesh network when said wireless networking infrastructures and said cellular network are not available, said users send respective emergency messages to a respective recipient through said device by said decentralized mesh network, when said users designate said recipient, only respective said recipient is able to view said emergency message or said personal location, and when said device is in a low-fidelity networking range, said device uses pre-composed emergency messages defined by said users, said pre-composed emergency messages are available for selection at the time of a positional location dissemination.

2. The personal locational and messenger device and system set forth in claim 1, further characterized in that said satellite communication infrastructure is a Global Positioning System/Global Navigation Satellite System.

3. The personal locational and messenger device and system set forth in claim 1, further characterized to work in rural and remote locations.

4. The personal locational and messenger device and system set forth in claim 3, further having a peer to peer network.

5. The personal locational and messenger device and system set forth in claim 4, further characterized in that said device is a computer device including smart phones, tablets, smart watches, and computers including supercomputers, mainframe computers, minicomputers, and/or microcomputers.

6. The personal locational and messenger device and system set forth in claim 5, further characterized in that said users send respective said personal location to said recipient respectively through said device by said decentralized mesh network.

7. The personal locational and messenger device and system set forth in claim 6, further allowing for tracking, storage, and communication of said emergency message and said personal location as authorized by said user.

8. A personal locational and messenger device and system, consisting of:
   A) a decentralized mesh network;
   B) a blockchain, said blockchain is an immutable blockchain system; and
   C) a device operatively associated with a non-transitory computer readable medium, said blockchain is associated with said decentralized mesh network to define a personal location platform and a messenger platform, said decentralized mesh network has a plurality of nodes operatively associated to each other and a full mesh topology or a partial mesh topology, said decentralized mesh network and said blockchain provide an immutable and decentralized platform, said device communicates through said decentralized mesh network, said blockchain stores a personal location and emergency messages provided by users, said decentralized mesh network disseminates said personal location and said emergency messages, and said device communicates through wireless networking infrastructures or through a satellite communication infrastructure, said device also communicates through a cellular network, said device communicates through said decentralized mesh network when said wireless networking infrastructures and said cellular network are not available, said users send respective emergency messages to a respective recipient through said device by said decentralized mesh network, when said users designate said recipient, only respective said recipient is able to view said emergency message or said personal location, and when said device is in a low-fidelity networking range, said device uses pre-composed emergency messages defined by said users, said pre-composed emergency messages are available for selection at the time of a positional location dissemination, said satellite communication infrastructure is a Global Positioning System/Global Navigation Satellite System, further characterized to work in rural and remote locations, further having a peer to peer network.

9. The personal locational and messenger device and system set forth in claim 8, further characterized in that said device is a computer device including smart phones, tablets, smart watches, and computers including supercomputers, mainframe computers, minicomputers, and/or microcomputers.

10. The personal locational and messenger device and system set forth in claim 9, further characterized in that said users send respective said personal location to said recipient respectively through said device by said decentralized mesh network.

11. The personal locational and messenger device and system set forth in claim 10, further allowing for tracking, storage, and communication of said emergency message and said personal location as authorized by said user.

\* \* \* \* \*